United States Patent [19]

Chang

[11] Patent Number: 4,647,242

[45] Date of Patent: Mar. 3, 1987

[54] JOINT APPARATUS OF SPEEDOMETER SHAFT

[76] Inventor: Mine K. Chang, 174, Chien Kuo Road, Tao Yuan City, Taiwan

[21] Appl. No.: 698,539

[22] Filed: Feb. 5, 1985

[51] Int. Cl.⁴ .......................... F16B 9/00; F16H 37/00
[52] U.S. Cl. ........................................ 403/21; 403/24; 403/261; 403/326; 403/360; 411/337; 24/681; 74/12; 464/52
[58] Field of Search ............... 403/21, 24, 326, 261, 403/155, 360; 411/337, 353, 352, 517; 24/662, 681; 74/12, 501 R; 464/52, 53

[56] References Cited

U.S. PATENT DOCUMENTS

| | | | |
|---|---|---|---|
| 1,914,928 | 6/1933 | Scott | 464/53 |
| 2,704,681 | 3/1955 | Fischer | 403/326 |
| 3,053,357 | 9/1962 | Stanger | 403/21 |
| 3,293,740 | 12/1966 | Enders | 403/261 |
| 3,531,144 | 9/1970 | Bizilia | 403/326 |
| 3,867,871 | 2/1975 | Shore | 403/261 |
| 4,181,030 | 1/1980 | Hewko | 74/12 |
| 4,280,338 | 7/1981 | Shannon et al. | 74/12 |
| 4,575,356 | 3/1986 | Murohushi et al. | 464/52 |

Primary Examiner—Cornelius J. Husar
Assistant Examiner—Peter M. Cuomo
Attorney, Agent, or Firm—Lane & Aitken

[57] ABSTRACT

A joint element for securing a speedometer shaft is disclosed which can be readily cut to allow removal of the shaft without damage to other parts when the speedometer is disassembled for service. The joint element comprises a ring of a flexible plastic material with a tapered edge on an inner surface thereof. The convex edge corresponds to a circular tapered recess on the shaft, and notches in said convex edge permit the ring to be pushed onto the shaft until said convex edge mates with said recess and permit the ring to be easily cut from the speedometer shaft after the ring is installed on the shaft.

3 Claims, 4 Drawing Figures

JOINT APPARATUS OF SPEEDOMETER SHAFT

BACKGROUND OF THE INVENTION

The present invention relates to joint apparatus for a speedometer shaft, specially concerning a joint apparatus providing easy and convenient fitting or repairing of the shaft of a speedometer.

Generally, the speedometer shaft is rotated by a cable wire and has a magnet at the top of the shaft. The magnet generates a magnetic flux and is thus inductively coupled with an aluminum cup to provide the electroforce needed to drive the indicator of the speedometer. The speedometer is connected to the speedomoter cable wire by a connection housing underneath the vehicle. The said shaft usually has two bearings to support its rotating and to avoid slipping. Conventionally, one of the two shaft bearings is entirely sealed which will cause problems. For example, the manufacturer needs to use heavy machines to rivet it and the process is complex and costly. Furthermore, it is very difficult to remove the bearing for repairing it. When the speedometer is out of order, the only way to remove the bearing is to destroy it, which will damage other parts.

SUMMARY OF THE INVENTION

An object of the present invention is to provide a joint apparatus which utilizes a plastic material and expands to mount on the rotating shaft easily and rapidly. Besides, the joint element edge provides notches for convenient replacing and mounting.

Another object of the present invention is to provide a joint apparatus which offers easy operation and efficient function to avoid conventional defects of the riveted bearings described above.

In accordance with this invention, joint apparatus for a speedometer shaft having a connection housing on the base of a speedometer for fixing the cable wire to the speedometer case, said connection housing having an axial aperture to permit the spindle shaft to pass therethrough, the one end of the spindle shaft being a worm gear, and the initial thread of said worm gear having a smooth annular surface to support the said shaft for rotation on the base. The lower part of the axial aperture of the connection housing has a receptacle portion, and the terminal end of spindle shaft has circular tapered recess, which extends beyond the receptacle portion, allows the joint element to be fitted thereto, in the inner wall of the joint element provides a tapered convex edge corresponding to the said circular tapered recess and in the rim wall of the said joint element there are notches, when the joint element joins the shaft the convex edge will mate with the circular tapered recess completely to prevent the joint element from dropping out.

DETAILED DESCRIPTION

Figure 1:
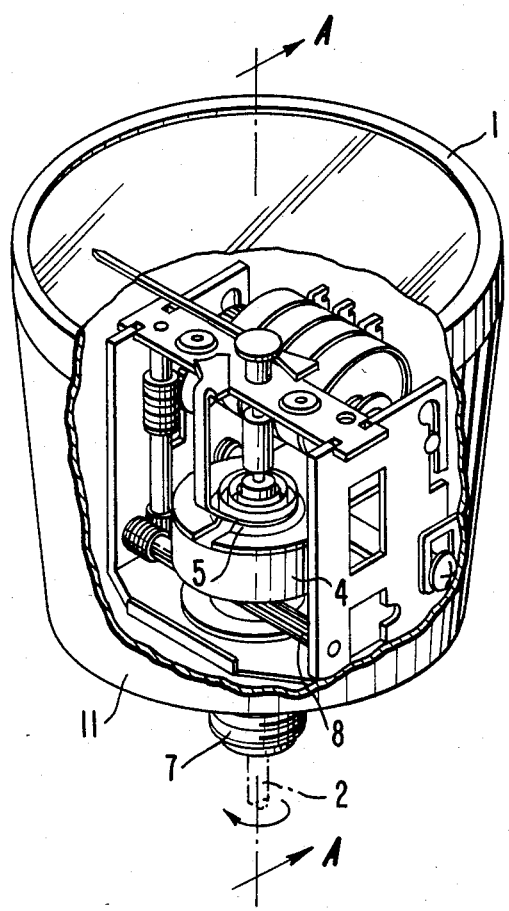
FIG. 1 is a partial perspective drawing of a speedometer.
Figure 2:
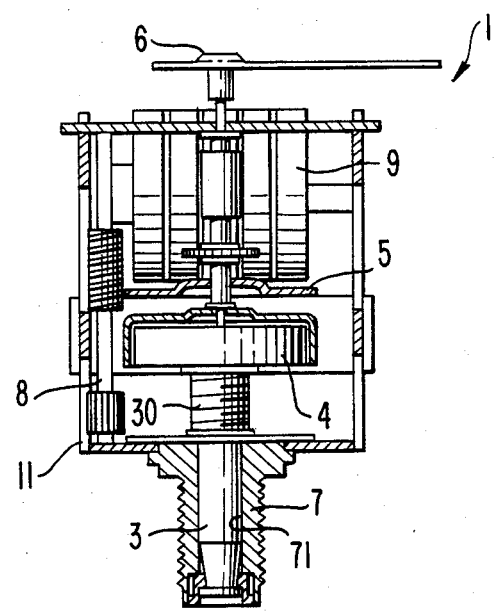
FIG. 2 is a sectional drawing taken from A—A direction of FIG. 1.

Referring now to FIGS. 1 and 2, a speedometer 1 includes a spindle shaft 3 driven by the cable wire 2 connected to the transmission element (not shown) at top of spindle shaft 3 is a magnet 4. The magnet generates a magnetic flux that couples an aluminum drag cup 5 thereby providing the force needed to move the indicator 6 through an angular displacement as a function of the rotation of the spindle shaft. On the base of speedometer 1 is a connection housing 7 for fixing the cable wire 2 to the speedometer case 11.

The afore-mentioned connection housing 7 has an axial aperture 71 to permit the spindle shaft 3 to pass therethrough. At the lower end of the spindle shaft 3, near the magnet 4, is a worm gear 30 which meshes with the driving rod 8 to move the speed register 9. (The contact of the shaft with the rod 8 at the worm gear 30 is not shown).

Figure 3:
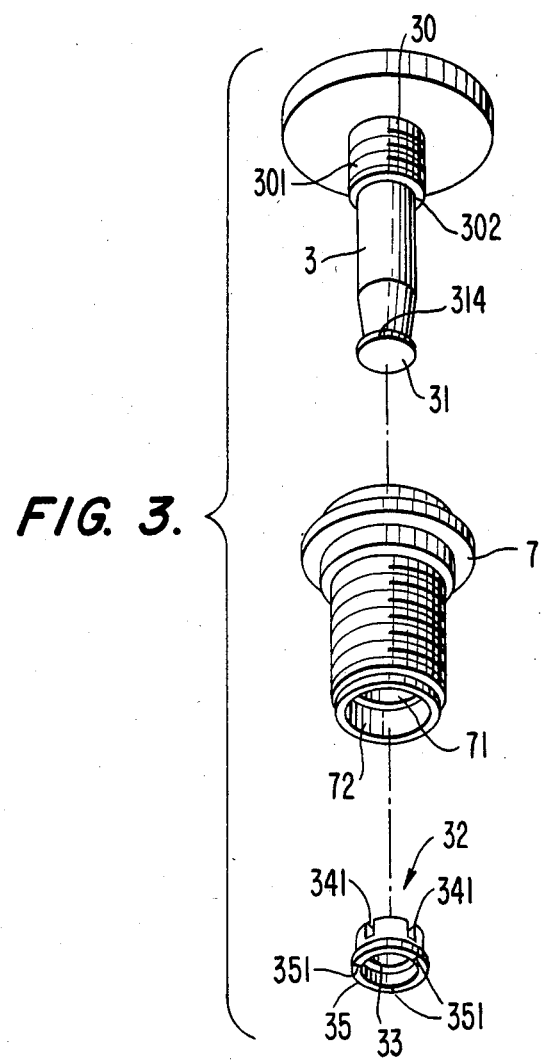
FIG. 3 is a perspective drawing for illustrating the working of the joint apparatus.

In FIG. 3, the initial thread 301 of the worm gear 30 has a smooth bottom circumference 302. When spindle shaft 3 is inserted through the axial aperture 71, the smooth bottom circumference 302 is held steadily against the rim on the upper end of axial aperture 71 by a joint element 32, enabling the spindle shaft 3 to rotate within the axial aperture 71. Thus, the spindle shaft 3 can only be removed from from the top of the connection housing.

Figure 4:
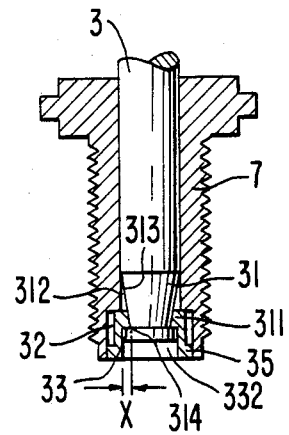
FIG. 4 is an enlarged drawing of the apparatus in FIG. 3.

The said connection housing 7 which axial aperture 71 has a receptacle portion 72 at its lower part as shown in FIG. 4. The length of the spindle shaft 3 is long enough so that its terminal end extends beyond said receptacle portion 72.

The terminal end 31 of the spindle shaft 3 provides a circular tapered recess 311, which is slanting from the shaft rim 312 inward toward the axial center 313 forming a difference Grade x, then extending outwardly and forming a disc 314 on which joint element 32 is installed.

The inner wall of said joint element 32 has a tapered edge 33 corresponded to the said circular tapered recess 311. Said convex edge 33 slopes from inner rim of the joint element 32 toward aperture 332, providing a difference grade which corresponds to grade x. That is, when the joint element 32 is attached to the spindle shaft 3, the convex edge 33 will just fit into the circular tapered recess 31 totally to prevent the joint element 32 from dropping out.

As shown in FIG. 3, in the rim wall of the joint element 32 has three equal pitch notches 341. When the joint element 32 joints into the shaft 3, the notches will expand outwards by themselves because of the material elastic characteristic of the joint element 32 used. The notches 341 will recover its normal pitch after the convex edge 33 falls into the recess 311. The bottom of the said joint element 32 has a flange 35, the outer diameter of which is received by the receptacle portion 72 of the axial aperture 71. There are marks 351 adjacent each notch 341 on the bottom of the joint element 32.

When the joint element is attached to the recess 311 of the shaft 3, it utilizes the match of the grade of convex edge 33 and grade x of recess 311 to assure proper relation of the spindle shaft 3. In addition, when the gearing part of spindle shaft 3 and connection housing 7 or magnet 4 and the parts of spindle shaft 3 breakdown, it is easy and convenient to repair those damaged parts by cutting the joint element 32 apart at the marks 351 on the bottom the joint element 32, then removing the spindle shaft 3. The spindle shaft 3 can then be removed from top of axial aperture 71 easily and won't destroy other parts of the apparatus.

What I claim is:

1. Joint apparatus for securing a speedometer shaft extending outwardly through a speedometer base, said shaft having an annular bearing surface thereon adapted to support said shaft for rotation on the speedometer base relative to the speedometer base, said annular surface being normal to the axis of rotation, and a circular tapered recess on the other end thereof, said apparatus comprising:

a connection housing having an axial aperture therethrough and adapted to receive the speedometer shaft, said connection housing being adapted to be connected to the speedometer base;

a receptacle portion in a distal portion of the axial aperture of said connection housing shaped and positioned so that the end of the shaft having the circular tapered recess extends beyond the receptacle portion in said axial aperture;

a flexible ring;

a tapered convex edge on an inner wall of said flexible ring, said convex edge corresponding to the circular tapered recess; and notches in said convex edge of said ring such that said notches permit said ring to be pushed onto the shaft until said convex edge mates with the circular tapered recess thereon, and such that said ring can be easily cut off the shaft at said notches, while the shaft is in said axial aperture, and a flange on the other side of said ring whereby the speedometer shaft is secured by joint apparatus that permits the shaft to be safely and quickly removed for service.

2. Joint apparatus according to claim 1, wherein said flange on said ring has marks corresponding to each notch to indicate the cutting place of said notches.

3. A joint element for securing a speedometer shaft in a connection housing connected to a speedometer base, said shaft having an annular bearing surface near one end thereof adapted to support said shaft for rotation, on the speedometer base said surface being normal to the axis of rotation, and a circular tapered recess on the other end thereof, said connection housing having an axial aperture through which the shaft is inserted and a receptacle portion in a distal portion of the axial aperture such that the end of the shaft having the circular tapered recess extends beyond the receptacle portion in said axial aperture, said joint element comprising:

a flexible ring;

a tapered convex edge on the inner surface of said flexible ring, said convex edge corresponding to the circular tapered recess; and notches in said convex edge that permit said ring to be pushed onto the shaft until said convex edge mates with the circular tapered recess thereon and that permit said ring to be easily cut off the shaft at said notches while the shaft is inserted in the axial aperture, whereby the speedometer shaft is secured by the joint element that permits the shaft to be safely and quickly removed for service.

* * * * *